United States Patent [19]

Weidlich

[11] 3,915,749
[45] Oct. 28, 1975

[54] BIOGALVANIC METAL-OXYGEN CELL

[75] Inventor: Erhard Weidlich, Erlangen, Germany

[73] Assignee: Siemens Aktiengesellschaft, Munich, Germany

[22] Filed: July 15, 1974

[21] Appl. No.: 488,839

[30] Foreign Application Priority Data
July 16, 1973  Germany............................ 2336114

[52] U.S. Cl............................................... 136/86 A
[51] Int. Cl.²..................................... H01M 29/02
[58] Field of Search............... 136/86 A, 86 E, 86 R

[56] References Cited
UNITED STATES PATENTS

| | | | |
|---|---|---|---|
| 3,457,488 | 7/1969 | Chodosh............................ | 136/86 E |
| 3,774,243 | 11/1973 | Ng..................................... | 136/86 R |
| 3,837,922 | 9/1974 | Ng..................................... | 136/86 R |

Primary Examiner—John H. Mack
Assistant Examiner—H. A. Feeley
Attorney, Agent, or Firm—Kenyon & Kenyon Reilly Carr & Chapin

[57] ABSTRACT

A biogalvanic metal-oxygen cell encased in an oxygen-permeable silicone rubber membrane having one metal anode, two oxygen cathodes disposed on both sides of said anode comprising silver screens to which a catalytically active material is applied, and electrolyte chambers between the anode and the cathodes. The edge of the metal anode is joined to a plastic frame of greater width than the metal anode for the formation of the electrolyte chambers. The marginal areas of the silver screens of the cathodes are free of catalytically active material and are extended across the plastic frame and joined to each other. The silicone rubber membrane encases the cathodes and the marginal areas of the silver screens so as to make close contact, and a silicone rubber jacket is applied over the portion of the silicone rubber membrane which encases the marginal areas of the silver screens.

7 Claims, 1 Drawing Figure

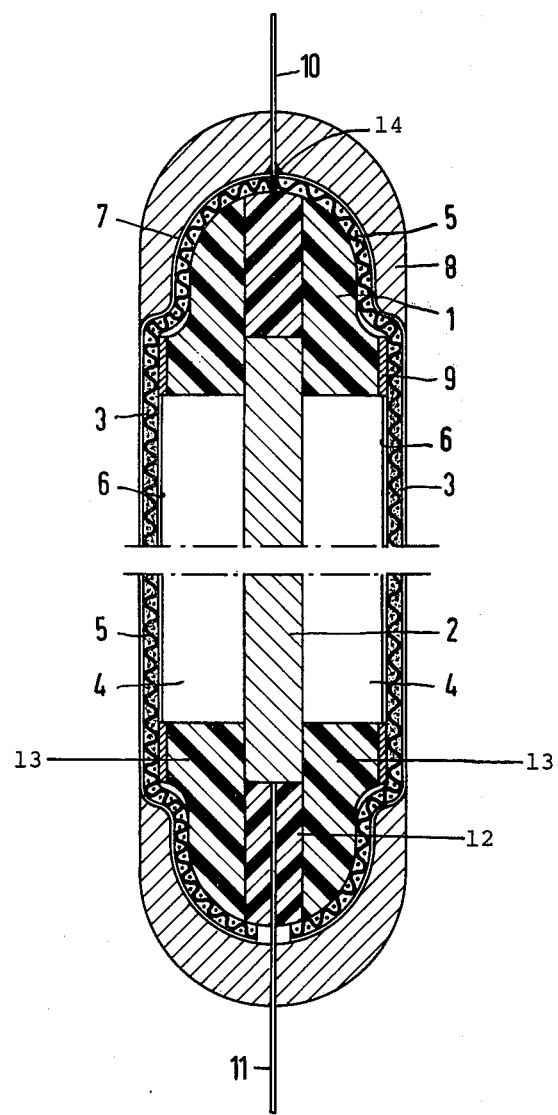

BIOGALVANIC METAL-OXYGEN CELL

BACKGROUND OF THE INVENTION

The invention relates to a biogalvanic metal-oxygen cell comprising an oxygen-permeable silicone rubber membrane encasing the cell, a metal anode, two oxygen cathodes which are disposed on both sides of said anode comprising silver screens to which a catalytically active material is applied, and electrolyte chambers between the anode and the cathodes.

Biogalvanic metal-oxygen cells with an expendable metal anode and catalyst-oxygen cathodes can be used as current sources for electronic equipment implanted in the human body such as heart pacers. German Offenlegungsschrift No. 2,039,519 provides a metal-oxygen cell in which the anode is disposed as a partition in the center of a symmetrically designed chamber-like cell while the two outside walls of the cell, disposed parallel to the anode, form the cathodes. A metal-oxygen cell so designed may be called a "double chamber cell." (See also "Biomedical Engineering," Vol. 9, No. 3, 1974, pages 98–103).

German Offenlegungsschrift No. 2,051,235 provides a metal-oxygen cell covered by and enclosed in a layer of oxygen-permeable material such as silicone rubber, the anode and cathode being separated from each other by a separating layer, in particular a layer of ion exchange resin relatively impermeable to oxygen and completely impermeable to larger molecules such as metal oxides, yet permeable to hydroxyl ions. Such a cell may also be designed as a double chamber cell, there being an oxygen electrode (cathode) on each side of the anode. The cathodes are generally of hydrophobic nature and consist of a catalyst powder and binder mixture which is applied to an electrically conductive, corrosion resistant screen such as platinum, gold or silver, which is later sintered. (See also "Medical & Biological Engineering" Vol. 9, 1971, pages 175–184).

The biogalvanic metal-oxygen cells as above described exhibit a number of qualities enabling satisfactory performance, at least with temporary implantations in animal experiments. Among them are, in particular, good body compatibility, the required seal against the surrounding tissue and the possibility of connecting several cells in series.

It is an object of the invention however to further improve a biogalvanic cell of the kind described above, with particular emphasis on improving its mechanical stability.

According to the invention, this is accomplished by the provision that the edge of the metal anode is joined to a plastic frame of a greater width than the metal anode for the formation of the electrolytic chambers; that the marginal areas of the silver screens of the cathodes are free of catalytically active material, and the marginal areas of the silver screens extend across the plastic frame and are joined to each other; that a silicone rubber membrane encases the cathodes and the marginal areas of the silver screens so as to make close contact; and that a silicone rubber jacket is applied over the portion of the silicone rubber membrane which encases the marginal areas of the silver screens.

A cell of great mechanical stability is obtained by the simultaneous use of a plastic frame consisting, in particular, of epoxy resin; of silver screens in the cathodes which extend beyond the actual active electrode surface and across the plastic frame and are connected to each other; and of an additional silicone rubber jacket provided in the area of the plastic frame. The silicone rubber jacket also results in an improved seal and, due to its elasticity, it also reduces the danger of mechanical irritation of the adjacent body tissue which, in turn, reduces the occurrence of undesirable tissue adhesions which may lead to encapsulation and, hence, to an interruption of oxygen supply.

In the electrochemical reaction taking place in the metal-oxygen cell, the metal such as aluminum, is oxidized to form oxides or oxide hydrates. In order to prevent the deposit of these oxidation products on the cathodes and thereby impair their activity, it is advantageous to provide, on the sides of the two cathodes facing the metal anode, a membrane preferably consisting of polyvinyl alcohol. Mixtures of polyvinyl alcohol and polyacrylic acid, or special cellophanes such as Cuprophan, are also suitable materials for the membranes.

Preferably applied to the silver screens of the cathodes as electro-chemically active material is carbon containing nitrogen bound to the silver screen by means of a binder, in particular polyvinyl alcohol. A polyvinyl alcohol/polyacrylic acid mixture may also be used as binder. In addition, the carbon may be provided with noble-metal catalysts, whereby increased activity can be obtained. The carbon may also be subjected to ammonia activation to increase its activity; carbon produced by this method is described in U.S. Pat. No. 3,755,193 and has proven to be particularly well suited. The anode consists advantageously of aluminum of high purity, particularly 99.99 percent pure or more. Other useful anode materials are aluminum alloys, in particular alloys containing zinc, and metals such as cadmium and zinc.

An anode as described in copending application Ser. No. 488,837, filed July 15, 1974 entitled "Aluminum Anode for Biogalvanic Metal-Oxygen Cells" has also proven to be particularly well suited. In such an anode, a metal screen is provided on both sides with aluminum layers, and the surfaces of the aluminum layers facing away from the metal screen are lapped or sandblasted and their marginal areas anodized.

In order to assure a good seal, the silver screens forming part of the cathode may advantageously be provided with a silver strip on the interface of the screens between the marginal areas which are free of catalytically active material and the area containing the catalyst; i.e., the actual electrode surface of the cathode. The silver strip is then connected to the plastic frame. In other words, a silver strip is applied to the side of each cathode facing the anode.

DETAILED DESCRIPTION OF THE PREFERRED EMBODIMENT

The invention will now be explained in greater detail by way of FIG. 1 showing a partial cross section of the preferred embodiment of the biogalvanic metal-oxygen cell according to the invention. A detailed description of the figure given below will also serve as an embodiment of the invention by way of example.

To produce a round metal-oxygen cell, an aluminum anode 2 approximately 2 mm thick is cemented into an epoxy resin ring 1 serving as an annular plastic frame. The ring is approximately 6 mm thick with an outside diameter of 50 mm and an inside diameter of approximately 36 mm. To simplify the assembly of the cell, the annular plastic frame 1 may be composed of three parts; each approximately 2 mm thick; a center part 12 and two outer parts 13. In that case the metal anode 2 is connected in a suitable manner to a silver current take-off lug 11 and glued into the center part 12 of the frame. The two outer parts 13 are then cemented to the center part, defining in the finished cell the electrolyte chambers 4 located between the anode 2 and the cathodes 3.

Silver screens 5 (wire diameter: 0.12 mm; approximately 220 screen openings per cm$^2$) approximately 60 mm in diameter are used to produce the cathodes 3. A silver ring 9 (outside diameter: 40 mm; thickness; 100 $\mu$m approximately) 2 mm wide is spotted concentrically on one side of each silver screen. The silver screen is soft-annealed for half an hour at 500°C and then pressed flat under approximately 40 N/mm$^2$ (approximately 400 kg/cm$^2$). A mixture consisting of 190 mg activated carbon containing nitrogen and 190 mg of an 5% aqueous polyvinyl alcohol solution is brushed on the side of the silver screen 5 facing away from the silver ring 9 to cover the area corresponding to the area defined by the silver rings. The next operation is drying and cross linking of the mixture at 150°C for one hour. The charge amounts to approximately 15 mg charcoal per cm$^2$. A round polyvinyl alcohol membrane 6 (diameter; approximately 40 mm) approximately 12 $\mu$m thick is provided on the reverse side of the silver screen, that is, on the side provided with the silver ring. This side of the cathode is subsequently glued, by means of an epoxy resin, to one side of the plastic frame containing the anode; correspondingly, a second cathode is glued to the other side of the plastic frame. The two silver screens 5 are then interconnected by spot welding and a silver lug 10 is provided for current take-off. This silver lug goes through the plastic frame 1 and is electrically insulated against the silver screens 5 by providing the silver screens with a cut-out 14 as shown in the FIGURE.

A common salt solution, i.e., a 0.9% NaCl solution, mixed with 100 mg/1 sodium carbonate to stabilize the pH value, is filled into the two electrolyte chambers through holes (not shown) in the plastic frame. The filling holes are subsequently closed by epoxy resin. Then the entire cell is enclosed in a silicone rubber membrane 7 approximately 19 $\mu$m thick. For this purpose, the cathodes as well as the silver screen areas free of catalyst are coated with about 20% silicone rubber solution in dichlormethane, whereupon the membrane is glued on and dried out. The anode (2) is also provided with a silver lug (II) for current takeoff.

If the plastic frame is composed of three parts, the two outer parts may be provided first with a cathode each, enclosed unilaterally by a silicone rubber membrane and subsequently glued, by means of epoxy resin, to the center part containing the metal anode.

Finally, a silicone rubber jacket 8 is cast around the plastic frame area of the cell produced in the described manner. The finished cell is approximately of pocket watch size with a volume of approximately 12.4 ml and a weight of approximately 31g.

What is claimed is:

1. A metal-oxygen cell comprising a metal anode, two oxygen cathodes disposed on both sides of said anode, said cathodes comprising silver screens having a catalytically active material deposited thereon, the marginal areas of said screens being free of catalytically active material and joined to each other; electrolyte chambers between said anode and cathodes, formed by a plastic frame greater in width than said anode and joined to said anode and cathodes; an oxygen-permeable silicone rubber membrane encasing said cathodes and the marginal areas of said silver screens in close contact; and a silicone rubber jacket applied over the portion of the silicone rubber membrane which encases the marginal areas of said silver screens.

2. The metal-oxygen cell of claim 1 wherein a membrane is provided on the sides of the cathodes facing the metal anode to prevent oxidation products from depositing on the metal anode.

3. The membrane of claim 2 which is comprised of polyvinyl alcohol.

4. The metal-oxygen cell of claim 1 wherein the catalytically active material is carbon containing nitrogen bound to said screens by means of a polyvinyl alcohol binder.

5. The catalytically active material of claim 4 wherein said carbon contains a noble-metal catalyst.

6. The cell of claim 1 wherein said metal anode comprises aluminum.

7. The cell of claim 1 wherein the silver screens of the cathodes are provided with a silver strip at the boundary between the marginal areas of the silver screens free of catalyst and the catalyst-containing areas.

* * * * *